United States Patent [19]

Gregory et al.

[11] Patent Number: 4,877,204

[45] Date of Patent: Oct. 31, 1989

[54] TILT/SWIVEL DISPLAY BASE

[75] Inventors: Joseph A. Gregory, Kingston; David L. Schaum, Woodstock, both of N.Y.

[73] Assignee: International Business Machines Corporation, Armonk, N.Y.

[21] Appl. No.: 333,740

[22] Filed: Apr. 5, 1989

Related U.S. Application Data

[63] Continuation-in-part of Ser. No. 260,979, Oct. 21, 1988, abandoned.

[51] Int. Cl.$^4$ .......................................... A47D 19/04
[52] U.S. Cl. ..................................... 248/298; 248/923
[58] Field of Search ............... 248/398, 139, 140, 141, 248/142, 371, 143, 346, 183, 418, 425, 185, 349, 1 F, 1 G, 1 I

[56] References Cited

U.S. PATENT DOCUMENTS

| | | | |
|---|---|---|---|
| 1,187,017 | 6/1916 | Snow | 248/143 |
| 1,259,265 | 3/1918 | Morgan | 248/143 |
| 1,566,178 | 12/1925 | Williams | 248/143 |
| 3,970,792 | 7/1976 | Benham | 248/183 X |
| 4,349,173 | 9/1982 | Volka | 248/346 |
| 4,368,867 | 1/1983 | Pendleton | 248/395 |
| 4,412,668 | 11/1983 | Musiel | 248/346 |
| 4,575,033 | 3/1986 | Henneberg | 248/185 |
| 4,591,123 | 5/1986 | Bradshaw | 248/371 X |
| 4,621,782 | 11/1986 | Carlson | 248/183 X |
| 4,643,382 | 2/1987 | Ojima | 248/371 |

*Primary Examiner*—J. Franklin Foss
*Attorney, Agent, or Firm*—Mark S. Walker

[57] ABSTRACT

A tilt/swivel display base for a product such as video display terminals and similar devices. The base contains few moving parts and results in only a limited displacement above the work surface. The display base has one or more rocker legs which have arcuate cross sections. The rocker legs allow forward and backward tilting of the video display terminal. Locking wedges are provided to stabilize the display base in a selected position. Swiveling is accomplished by rotating the entire video display terminal and display base about a vertical axis. Rotation about a vertical axis is possible due to the small area of contact between the display base rocker legs and the work surface. The locking wedges are maintained in position by locking wedge flanges with mate with a groove in the rocker leg. A tensioning device is provided to insure constant pressure between the locking wedge and the rocker leg. A stop can be incorporated on the rocker legs to prevent excessive tilting.

10 Claims, 2 Drawing Sheets

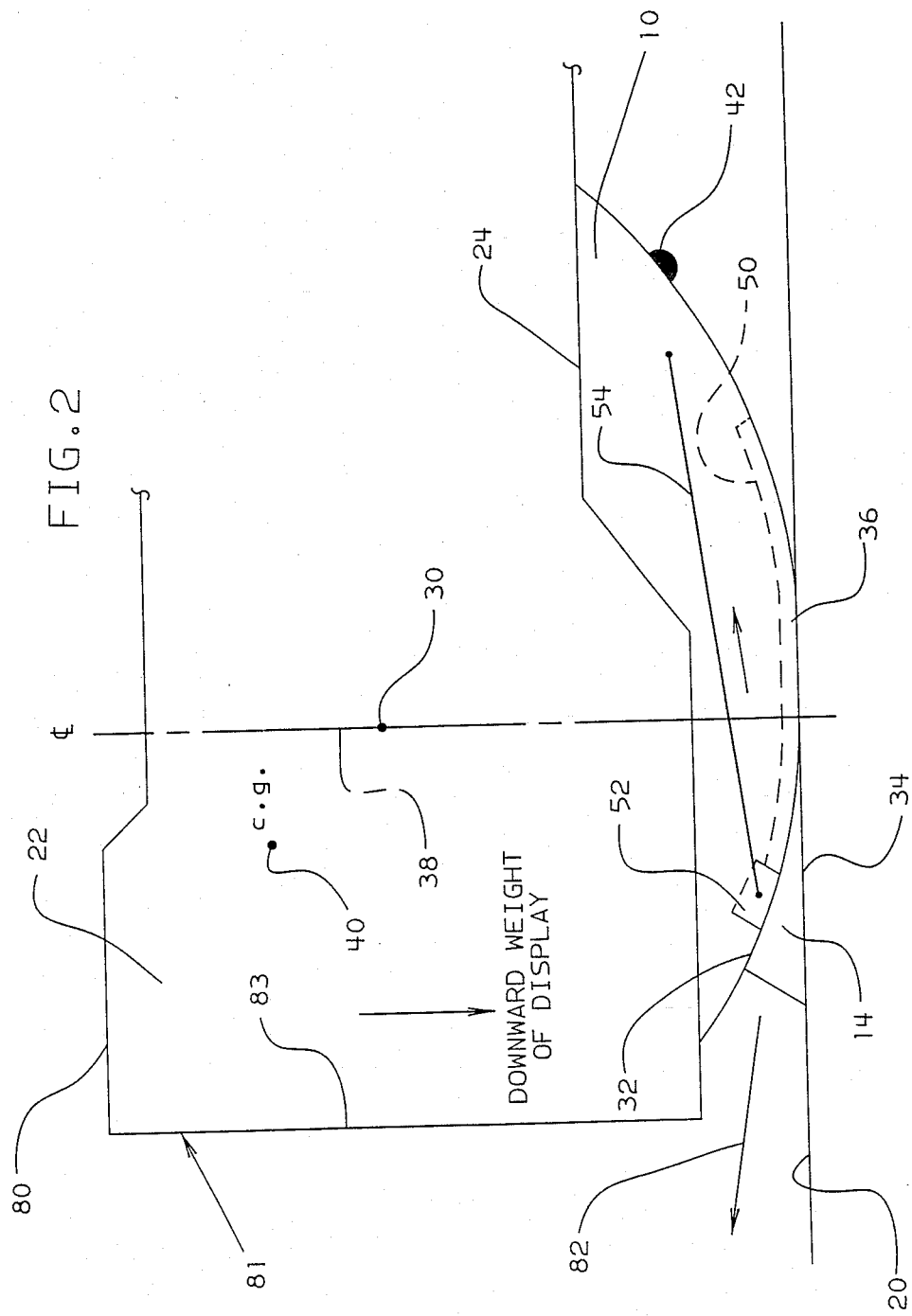

TILT/SWIVEL DISPLAY BASE

This application is a continuation in-part of application Ser. No. 07/260979 filed on Oct. 21, 1989, now abandoned.

BACKGROUND OF THE INVENTION

1. Field of the Invention

The present invention relates to a product mounting mechanism and more particularly to a base apparatus that allows for adjustment of the degree of tilt and swivel of a cathode ray tube terminal or similar device.

2. Description of the Prior Art

The increasing use of video display terminals, display units and similar products in the work place has made it essential to make the devices more convenient and comfortable for the worker. Ergonomic studies have shown that properly oriented office equipment increases the productivity and reduces the fatigue of the workers using the equipment. This has led to a demand for display device accessories for allowing forward and backward tilt to minimize the glare from various light sources and side to side swivel to create an optimum viewing angle.

A variety of solutions have been developed to the tilt/swivel problem. For example, U.S. Pat. No. 4,453,387 to Sweere provides a tilt and swivel capability by rotatably mounting a crosspiece in the base and attaching a mounting plate designed to tilt about the crosspiece. The mounting plate frictionally engages the crosspiece and allows the operator to adjust both the tilt and swivel. U.S. Pat. No. 4,349,173 to Volka et al. illustrates a display base that employs rocker legs on the bottom of the device providing forward and backward tilt. The rocker legs are received in a slotted base which provides the frictional support to lock the display into position. Finally, U.S. Pat. No. 4,575,033 discloses a tilt swivel base where a concave member is attached to the display unit while the base has a convex surface to receive the concave portion of the display. Friction between the concave and convex surface allows for the adjustment of the display. Swiveling of the display unit is accomplished by turning the base within a second base support.

Mounting mechanisms described in the prior art are typically comprised of complex mechanical parts and must be carefully assembled and maintained in order to provide the desired function. In addition, the complexity increases the cost of the adjustable base. A second problem of vertical displacement has developed as video display terminals have increased in size. While a tilt/swivel support and base that vertically displaces a monitor several inches from the work surface is acceptable when a small 11 or 13 inch monitor is being used, the increased use of larger 19 inch and 23 inch monitors in engineering and publishing application has rendered this displacement unacceptable. Large monitors require support bases with minimal vertical displacement.

SUMMARY OF THE INVENTION

The present invention is directed at solving the above mentioned problems by providing a simplified tilt/swivel display base that provides for infinite tilt and swivel adjustment with a minimum vertical offset from the work surface. This is accomplished by the provision of arcuate rocker legs for attachment to a product such as a video display terminal or similar device. Arcuate rocker legs are in contact with the work surface without the requirement for a separate base support, thereby minimizing the displacement of the display unit from the surface. Positioning control is accomplished by the provision of a frictional locking wedge interposed between the rocker leg and the work surface which locks the rocker leg in the position selected by the operator. The frictional locking member is retained in position through the use of a flange that mates with a groove in the rocker leg. Necessary frictional force is assured by providing a tensioning device to securely engage the locking wedge with the rocker leg.

BRIEF DESCRIPTION OF THE DRAWINGS

FIG. 2 is a side view of the display base supporting a video display terminal.

DETAILED DESCRIPTION OF THE INVENTION

Figure 1:
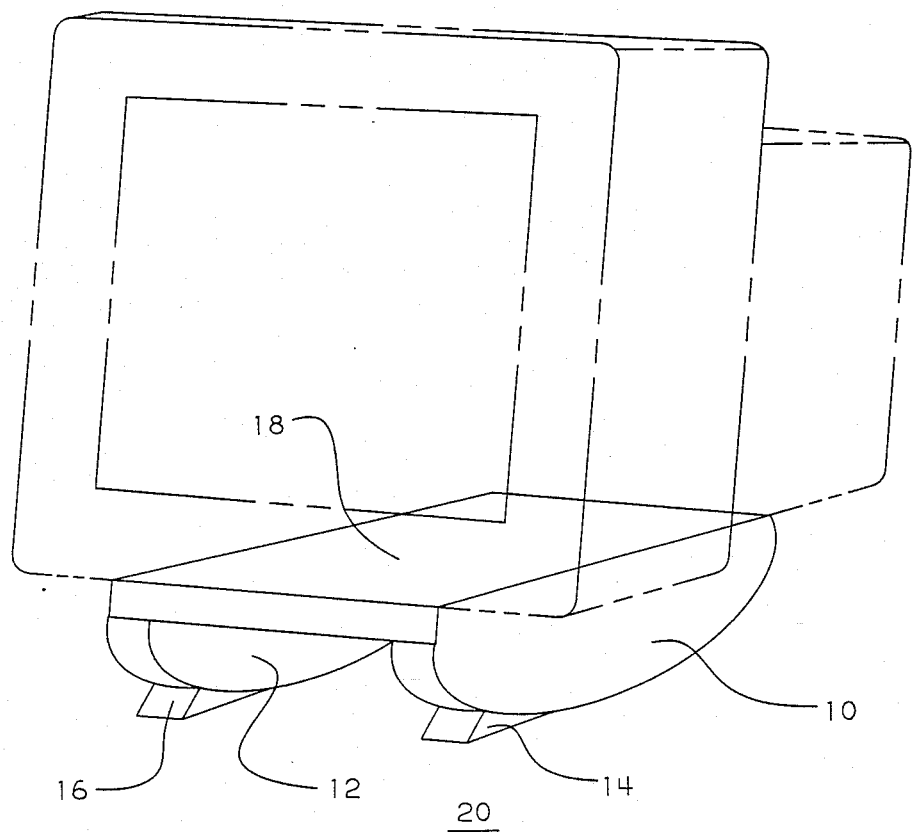
FIG. 1 illustrates a typical form of the tilt/swivel display base.

The following detailed description will be more easily comprehended when it is read with reference to the foregoing drawings in which like reference characters symbolize corresponding parts.

FIG. 1 illustrates a tilt/swivel display base according to the present invention. The display base can be constructed as a separate unit as shown in FIG. 1 and later attached to a video display terminal, or it can be manufactured to be incorporated as part of the display unit. The display base is comprised of rocker legs 10 and 12 and frictional wedges 14 and 16. The top surface 18 may be attached to the video display terminal. The arcuate rocker legs 10 and 12 rest on work surface 20.

FIG. 2 illustrates a more detailed view of a display base incorporated with a video display terminal 22. Rocker leg 10 is attached to display terminal 22 along its top surface 24. The bottom surface of the rocker leg is a generally semi-circular arc allowing the display to be tilted about a horizontal axis 30.

Figure 3:
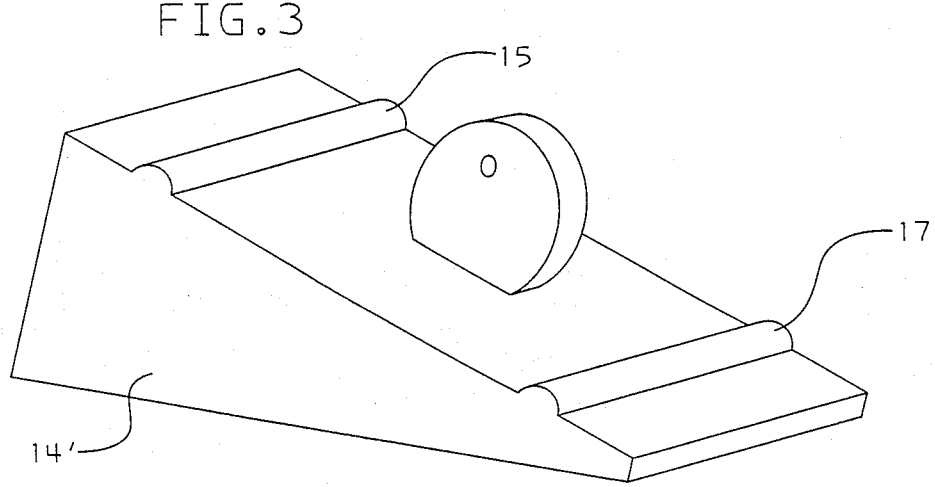
FIG. 3 is a perspective view of an alternate embodiment of a locking wedge according to the present invention.

Positioning of the display is preserved through the use of locking wedge 14. Locking wedge 14 is oriented so that its upper surface 32 is in frictional contact with rocker arm 10. The lower surface of 34 is in contact with the work surface 20. The size of the wedge is selected so that the rocker leg always maintains contact with the work surface, for example at point 36. Stable positioning of video display terminal is achieved by mounting the rocker legs so that the center line of the arc of the rocker legs 38 is offset from the center of gravity 40 of the video display terminal 22. This offset insures that gravitational forces will continue to exert pressure on the frictional wedge 14. An alternate embodiment of the locking wedge is shown in FIG. 3. Locking wedge 14' has two raised areas 15, 17 formed on the rocker arm contact surface. These raised areas reduce the friction between the wedge and the rocker providing easier control of the device. Various configurations of raised surfaces may be employed to achieve particular frictional force values. The surfaces need not be ridges and could, for example, be raised hemispheres, or other non-uniform shapes.

Rocker leg 10 is equipped with a stop 42 which prevents the unit from being tilted too far backwards and possibly damaging attached cables.

Locking wedge 14 is kept in place in relation to the rocker leg through the use of a flange and groove system. Rocker leg 10 has a groove 50 formed in the bottom side of its semi-circular surface. Flange 52 of locking wedge 14 is engaged in groove 50 insuring that locking wedge 14 travels parallel to the rocker leg 10. In addition, a tensioning device 54 is attached to the rocker leg 10 and locking wedge flange 52 to insure that the wedge stays tightly in position between the rocker leg and the work surface. The tensioning device 54 can be a rubber cable, clock type spring or similar device for placing tension between the wedge and the rocker leg. In the preferred embodiment a clock spring providing constant tension is employed.

The operation of the device is accomplished by applying pressure to video display terminal 22. For example, to tilt the device forward the operator applies pressure to the upper front edge 80 of the terminal. This pressure would cause the rocker legs to rotate forward forcing the locking wedge forward in the direction of arrow 82. When the operator ceases applying pressure to the upper corner, the unit remains in place due to the frictional forces on locking wedge 14 caused by the offset center of gravity.

Similarly, to rotate the display backwards the operator applies an backward force at upper edge 81. The upper force causes a rotation of the device clockwise around point 30. Locking wedge 14 is drawn backward by tension device 54. The appropriate line of locking wedge 14 with rocker arm 10 is maintained by the aforementioned flange and groove system. Stop 42 insures that the device is not rotated too far back. In the preferred embodiment, the video display surface may be rotated from 5 degrees forward of vertical to 15 degrees backward of vertical with infinite position settings in between.

Video display terminal 22 may be swiveled by applying pressure to a side of the video display, for example, at 83. Since the rocker legs 10 and 12 have only a small area of contact 36 with the work surface 20, the device may be easily rotated about a vertical axis. Flange 52 and groove 50 insure that locking wedge 14 travels with the display device. In a preferred embodiment, display may be swiveled 180 degrees, from 90 degrees left of front to 90 degrees of front.

Although the preferred embodiment employs two rocker legs 10 and 12 oriented on either side of the video display terminal, it will be apparent to developers in this area that similar results can be accomplished by using a single wide leg or three or more legs spaced at intervals across the bottom of the device. This description of the preferred embodiment is not intended to limit application of the inventive concept.

It will be understood from the foregoing description that various modifications and changes may be made in the preferred embodiment of the invention without departing from its true spirit. It is intended that this description be for purposes of illustration only and should not be construed in a limiting sense. The scope of this invention should be limited only by the language of the following claims.

We claim:

1. A support apparatus for movably mounting a product, said apparatus comprising:
   at least one rocker member connectable along its top to the bottom of said product the bottom of said rocker member having an arcuate profile between an end of the rocker member nearest the front of said product and an end of the rocker member nearest the back of said product,
   friction means for holding the rocker member in a selected position, wherein said friction means is generally triangular in shape having a first surface in frictional contact with said rocker member and a second surface in frictional contact with a support surface;
   constant force tension means connected to said rocker member and to said friction means to maintain said frictional means in frictional contact with said rocker member and said support surface;
   and oriented so that the bottom of said rocker member is in contact with said support surface.

2. A support apparatus as in claim 1, wherein the center line of said arcuate profile of said rocker member is offset from the center of gravity of said display unit.

3. A support apparatus as in claim 1, wherein said rocker member has a slot in said bottom and wherein said friction means further comprises a flange, said flange engaged in said groove and operable to guide said friction means in relation to said rocker member.

4. A support apparatus as claimed in claim 3, further comprising tension means connected to said rocker member and to said friction means in frictional contact with said rocker member and said support surface.

5. The apparatus of claim 4, further comprising means for preventing tilting beyond a fixed point.

6. The apparatus of claim 1 wherein said friction means further comprises a plurality of raised surfaces formed on said first surface of said friction means to reduce frictional forces between said friction means and said rocker.

7. The apparatus of claim 6, wherein said raised surfaces comprise two raised ridges on said first surface of said friction means to be perpendicular to the longitudinal axis of said rocker member.

8. A support apparatus as in claim 7, wherein said rocker member has a slot in said bottom and wherein said friction means further comprises a flange, said flange engaged in said groove and operable to guide said friction means in relation to said rocker member.

9. A support apparatus as claimed in claim 8, further comprising tension means connected to said rocker member and to said friction means in frictional contact with said rocker member and said support surface.

10. The apparatus of claim 9, further comprising means for preventing tilting beyond a fixed point.

* * * * *